Patented Dec. 24, 1940

2,226,339

UNITED STATES PATENT OFFICE 2,226,339

THREE-COLOR FILM AND METHOD OF MAKING SAME

William T. Crespinel, Los Angeles, Calif., assignor to Cinecolor, Incorporated, Los Angeles, Calif., a corporation of California No Drawing. Application January 3, 1938, Serial No. 183,130

9 Claims. (Cl. 95—2)

This invention relates generally to the art of color photography and more particularly to the making of three-color transparencies suitable for projection purposes. While my invention is equally applicable to both still and motion picture photography, it finds its widest application in the latter branch of the photographic art, and I will consequently describe the preferred form of my invention as applied thereto, it being understood, however, that wherever the word "film" is used it is to be taken as comprehending all types of photographic media, including plates and paper films as well as flexible films made with bases of Celluloid or other suitable substances.

Three-color processes and pseudo three-color processes have, from time to time, been given to the industry, but few of these have proved to be commercially practicable, and those that have had any commercial success at all necessitate the use of complicated special equipment and the expenditure of additional money over the cost of processing ordinary black and white film. It is consequently, the major object of my invention to provide a three-color process adaptable for motion picture productions which can be performed with a minimum of extra equipment and cost over the production of black and white films, and at the same time produce clear transparent colors which are substantially true to nature.

Broadly speaking, my invention comprehends the production of three separate color-value negatives by any suitable method, either separately in the camera or subsequently from one or more original negatives, the printing of two of these negatives in register to a positive film, the toning of the two positive images thus produced to give a two-color picture, and the imbibition of a third color image upon the two-color film to give complete three-color rendition. By using chemical toning for the production of two of the three images, I am able to eliminate the disadvantages inherent in processes which use bleaching and dyeing steps, and as a result thereof, I obtain images which are very sharply defined and have exceptionally clear high lights as distinguished from the images obtained by the familiar dye processes which often leave the high lights stained unless an excessive amount of washing is done which is usually injurious to the film.

In the practice of my invention, I first produce three suitable color-value negative-printing films by any well-known means that will insure their color separation. These negatives may be produced by various types of cameras adapted to expose the individual negatives through appropriate filters so that they will record red, green, and blue color values respectively, or by any other suitable means which will give proper color separation. The three filters used may of course vary as to their exact spectral ranges but in general they will comprise those portions of the spectrum which are generally termed red, green, and blue.

In producing the positive print in colors, I may use either a film having an emulsion on one side only, or a film having an emulsion on both sides, this latter type of film being generally known in the art as duplitized film, the steps of my process being substantially the same no matter which type of film is used.

As the first step in my process, I print the red-recording negative to one side of the positive raw stock and the green-recording negative to the other side of the raw stock in register with the image from the red negative. This printing can be done by any well-known means and equipment, and if a duplitized film is used, the two color-value latent positive images will be on opposite sides of the base. If, however, a film is used which has an emulsion on one side only, then the two latent images will be in this one emulsion on the one side of the base, but will be in separate strata of the emulsion layer, that is to say, one latent image will be in the stratum of the emulsion which is adjacent the Celluloid base, and the other latent image will be in the outer stratum of the emulsion layer. The emulsion in this latter case is preferably impregnated with a water soluble yellow dye, such as tartrazine, which acts to arrest the rays from the printing light, and thus facilitates locating the printed images in the upper and lower strata of the emulsion respectively. The film is then developed, fixed, and washed in the conventional manner, producing a pair of superposed substantially complementary color-value positive images, the images which were printed from the green-recording negatives portraying the red color values, and the images which were printed from the red-recording negatives portraying the blue-green color values.

Both of the developed and fixed images are now toned blue, preferably by iron toning with any suitable sequence of steps. One satisfactory method for toning these images blue, consists in immersing the film in a solution comprising substantially the following formula:

| | | |
|---|---|---|
| Iron chloride | grams | 10 |
| Potassium ferricyanide | do | 6 |
| Potassium oxalate | do | 12 |
| Oxalic acid | do | 10 |
| Potassium alum | do | 14 |
| Water to make | liter | 1 |

The film is preferably left in this solution until the silver images are completely converted, after which it may be subjected to a thorough water wash and immersed in the following solution:

| | | |
|---|---|---|
| Sodium citrate | grams | 20 |
| Nickel chloride | do | 4 |
| Water to make | cc | 250 |

This treatment slightly degrades the blue color and to prevent this, approximately 2½ grams of oxalic acid should be added to the above formula. If the slight degrading of the blue is not objectionable then the oxalic acid can be left out. After the film leaves this solution, it is again washed and is then ready for the next step in the process.

An alternative method for producing the blue-toned image is as follows: The film is first immersed in a bath comprising 10 grams of potassium ferricyanide in a liter of water until the silver image is completely converted to silver ferrocyanide. The film is then washed and immersed for about 5 minutes in a solution comprising 5 grams of nickel chloride in a liter of water, which solution converts the silver ferrocyanide images into nickel ferrocyanide. Following this conversion, the film is treated for about 3 minutes with a solution containing 8 grams of ferric chloride in 250 cc. water, which completes the transformation of the images into a blue-green color, which indicates that the image is probably a combination of ferric ferrocyanide and nickel cyanide or a complex iron-nickel cyanide salt. The film is then preferably washed and treated for about 2 minutes with an acid bath which may comprise approximately 5 cc. of hydrochloric acid in 250 cc. of water, which treatment will result in the blue-green images, turning to a deep blue as before.

The image which is to be colored magenta is now treated by any suitable means for approximately 3 minutes with a basic solution of an organic compound capable of reacting with nickel ferrocyanide to give a magenta-colored nickel organic compound. One suitable formula for this step is:

| | | |
|---|---|---|
| Dimethylglyoxime | grams | 2 |
| Sodium hydroxide | do | 2 |
| Water | cc | 250 |

Another solution which may be used is:

| | | |
|---|---|---|
| Dimethylglyoxime | grams | 2½ |
| Ammonium hydroxide | cc | 2½ |
| Water | do | 250 |

If the images have been formed on opposite sides of the film base, the magenta color-value image can be treated by floating the film across the above solution, by spraying or by other suitable means, which will prevent the solution from reaching the images on the opposite side of the film. If the two images have been formed on the same side of the base, i. e. in different strata of a single emulsion layer, they should be printed so that the magenta color-value image is in the outer stratum of the emulsion layer and the film is then subjected to the dimethylglyoxime solution for a sufficient length of time to convert the outer images without contaminating the inner images. These operations convert the Prussian blue image into a ferric hydroxide image and because of the presence of nickel ferrocyanide, a magenta lake is formed. As will be seen, these operations are relatively rapid and inexpensive and have been found to give extremely sharp images with clear highlights, which is a distinct advantage in making color transparencies.

At this stage of the proceedings, we have a photographic transparency which comprises two superposed images in exact registry, one of which reproduces the red color values and is colored magenta, the other of which reproduces the green color values and is colored blue. In order to complete the three-color photograph, it is of course necessary to superimpose upon these two images a third image which will contribute the yellow color-values to complete the subtractive three-color spectrum. As previously mentioned, my process contemplates the addition of this third image by photo-mechanical printing, more generally known as imbibition.

The first step of course in any imbibition process is the production of a suitable matrix for effecting the transfer of dye, and while numerous kinds of photographic stock can be used for producing this matrix, I prefer to use a specially-prepared film generally known in the art as "wash-off" film which is peculiarly adapted for dye transfer work, and is easy to work with. The images previously obtained on the blue-recording negative are printed on to the transfer stock through the base, and the resultant latent images are developed, fixed, and washed in the usual manner. This positive print will then have a silver image portraying or reproducing the minus-blue or yellow color values in the object photographed. The images on this transfer film are then bleached in suitable manner as for instance by treatment with a solution comprising:

| | | |
|---|---|---|
| Citric acid | grams | 12.5 |
| Potassium bromide | do | 12.5 |
| Potassium ferricyanide | do | 12.5 |
| Potassium bichromate | do | 25 |
| Chrome alum | do | 50 |
| Water to make | liter | 1 |

The film is left in this bleaching solution for approximately 2 minutes until the silver is bleached and rendered substantially transparent and the gelatin containing the silver image is hardened. The film is then immersed for about 1 minute in a wash water solution at a temperature of approximately 90° F. which removes the unexposed gelatin, leaving only the bleached silver image with its immediately contiguous gelatin.

Following this warm water wash, for eliminating the unexposed gelatin, the film is washed in water of normal temperature, and fixed in either a normal hypo bath or a hardening fixing bath, is again washed and dried, and now comprises a suitable matrix recording in relief the yellow color-values of the image photographed, it being noted that because of the bleaching action before mentioned, the image remaining on the film is comparatively clear.

The matrix is now impregnated with an acid yellow dye of any suitable formula such for example as:

| | |
|---|---|
| Du Pont wool yellow ex. conc. | grams 3 |
| Acetic acid | do 5 |
| Water | cc 100 |

Ordinarily it will take approximately 5 minutes for the gelatin relief image to become thoroughly saturated with the yellow dye, so that it is ready for the imbibing step. The excess dye is then blown off and the matrix is brought into contact with either the blue or magenta images if duplitized stock has been used, or with the magenta image if the single coat stock has been used, suitable means being employed of course to see that the yellow image is imbibed in perfect register with the blue and magenta colored images.

Ordinarily it will be found that contact between the matrix and the previously colored positive print for a period of about 1½ to 2 minutes is sufficient to allow for good transfer of the yellow dye from the matrix to the positive print. After this imbibition step, the film is dried and is then ready for projection, although if duplitized stock is used, it is usually preferable to varnish one or both sides of the film, to protect the emulsions during projection.

If it is desired to incorporate a sound track in the resultant colored film, it may be printed from a sound track negative in the usual manner, various combinations of coloring being possible. If duplitized stock is being used, it will usually be found preferable to print the sound track only on the side which is to be colored and remain blue, since an iron-toned track has been found to be extremely satisfactory.

If single coated stock is used, i. e. film with an emulsion on one side only, the sound track may be printed through the base of the film and restricted to the inner stratum which is to carry the blue picture image, so that the resultant track will also be blue. If desired, however, the track can be printed in one operation in both strata of the emulsion and the final film will then have a substantially black and white sound track, since that portion of it which lies in the inner stratum will be toned blue, and that portion which lies in the outer stratum will be converted to a magenta tone.

From the foregoing, it will be seen that I have provided a relatively simple and highly efficient method of producing a three-color transparency which insure clear high lights, images of adequate density and sharp outline, and accurate color rendition, with a minimum of cost and time expended. While I have given particular formulas throughout for the preferred practicing of my invention, it is to be understood of course that certain modifications can be made in the ingredients and in the proportions of said formulas without departing from the scope of my invention, and it is to be understood that the foregoing description is not to be taken as limiting but is merely to be considered as illustrative of the broad principles of my invention as defined in the appended claims.

I claim as my invention:

1. The process of producing a colored positive photograph from red, green, and blue color-value negatives which includes: producing superimposed positive images on a film from said red-recording and green-recording negatives; toning said positive images blue by treatment with solutions containing iron chloride and nickel chloride; converting the image printed from the green-recording negative to a magenta color by treatment with an alkaline solution containing dimethylglyoxime; producing a matrix from the blue-recording negative by forming a positive print thereof on a separate film and bleaching said print to produce a relief image; impregnating said matrix with a yellow acid dye; and imbibing a yellow image on to said positive film in register with said blue and magenta images by means of said matrix.

2. A process as defined in claim 1 in which the iron chloride solution comprises substantially 10 grams of iron chloride, 6 grams of potassium ferricyanide, 12 grams of potassium oxalate, 10 grams of oxalic acid, 14 grams of potassium alum, and 1 liter of water; the nickel chloride solution contains substantially 20 grams of sodium citrate, 4 grams of nickel chloride, and 250 cc. of water; and said dimethylglyoxime solution contains substantially 4 grams of dimethylglyoxime, 2 grams of sodium hydroxide, and 250 cc. of water.

3. A process for producing a colored photograph which includes: producing two superimposed positive silver images on a photographic film; converting said images to a blue metallic salt capable of reacting with dimethylgloxime by treatment with solutions containing a soluble ferricyanide, a soluble ferric salt and a soluble nickel salt; and converting one of said images to a magenta color by treatment with a solution containing dimethylgloxime.

4. A process for producing a colored photograph from three color-separation negatives which includes: producing superimposed positive images from two of said negatives; toning said superimposed images blue with solutions containing a soluble ferricyanide, a soluble ferric salt and a soluble nickel salt; converting one of said blue images to a magenta color by treatment with a solution of an organic compound capable of reacting with nickel ferrocyanide to give a nickel organic compound; and imbibing a yellow image on said film in register with said two images by means of a matrix produced from the third negative.

5. A process for producing a colored photograph from three color-separation negatives which includes: producing superimposed positive images from the green-recording and red-recording negatives respectively; toning said superimposed images blue with solutions containing a soluble ferricyanide, a soluble ferric salt and a soluble nickel salt; converting the image produced from the green-recording negative to a magenta color by treatment with a dimethylgloxime solution; and imbibing a yellow image on said film in register with said two images by means of a matrix produced from the third negative.

6. A process for producing a colored photograph from three color-separation negatives which includes: producing superimposed positive images from two of said negatives; toning said superimposed images blue with solutions containing a soluble ferricyanide, a soluble ferric salt and a soluble nickel salt; converting one of said blue images to a magenta color by treatment with a basic solution of dimethylgloxime; and imbibing a yellow image on said film in register with said two images by means of a matrix produced from the third negative.

7. A process for producing a colored photograph which includes: producing two superimposed positive images on a photographic film; toning said images blue with solutions containing a soluble ferricyanide, a soluble ferric salt and a soluble nickel salt; and converting one of said images to a magenta color by treatment with a solution of an organic compound capable of reacting with nickel ferrocyanide to give a nickel organic compound.

8. A process for producing a colored photograph which includes: producing two superimposed positive images on a photographic film; toning said images blue with solutions containing a soluble ferricyanide, a soluble ferric salt and a soluble nickel salt; and converting one of said images to a magenta color by treatment with a dimethylgloxime solution.

9. A process as defined in claim 8 in which said dimethylgloxime solution is basic.

WILLIAM T. CRESPINEL.